July 15, 1952 J. L. WADDELL 2,603,084
BELT TESTING APPARATUS
Filed June 29, 1949
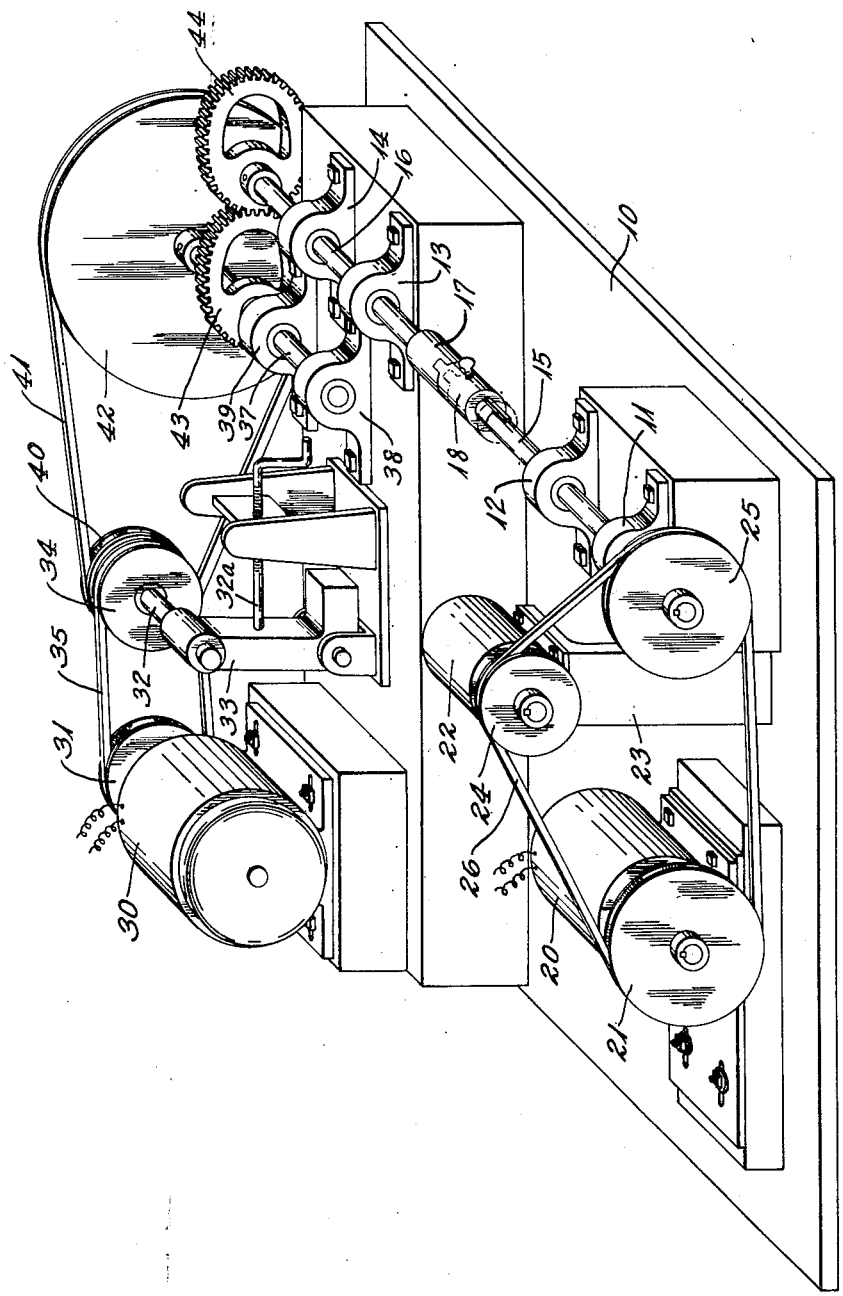
Inventor
Joseph L. Waddell
By
Atty.

UNITED STATES PATENT OFFICE 2,603,084

BELT TESTING APPARATUS

Joseph L. Waddell, Akron, Ohio, assignor to The B. F. Goodrich Company, New York, N. Y., a corporation of New York Application June 29, 1949, Serial No. 101,948

3 Claims. (Cl. 73—7)

This invention relates to belt testing apparatus and is especially useful in determining noisy operation and slippage of V-belts.

In the use of belts of small cross-section such as V-belts used for driving the generators and fans of automobiles or for driving light machinery, it has been found that considerable slippage of the belts takes place with fluctuation in load and velocity. Such slippage is evidenced by generation of noise or squeal during operation.

In the manufacture of such belts it is desirable to compare belts of different constructions as to noise generation under conditions simulating conditions encountered during use of the belts while at the same time confining use of the belt to the laboratory where temperature and other conditions may be maintained constant and the belts being tested may be inspected readily.

Objects of the present invention are to provide for testing of belts under conditions simulating conditions under which they are to be used, to provide for testing the belts for noise or squeal generation under fluctuating load or velocity conditions, to provide predetermined fluctuations of speed, to provide for limbering the belt at high speed prior to subjecting it to fluctuating slow speed conditions, and to provide for quick shifting of adjustment from constant speed to fluctuating speed conditions.

These and other objects will appear from the following description and the accompanying drawing.

The drawing is a perspective view of apparatus constructed in accordance with and embodying the invention.

Referring to the drawing, the numeral 10 designates a base plate which supports in axial alignment with each other bearings 11, 12, 13, 14 in which a pair of shafts 15, 16 are mounted for free rotation in spaced apart relation. A clutch member 17 is fixed to the end of shaft 16 and a cooperating clutch member 18 is slideably mounted and keyed to shaft 15. The arrangement is such that by engaging the clutch members shafts 15 and 16 may be rotated in unison and by disengaging them the shafts may be rotated independently.

An electric motor 20 is adjustably mounted on the bed plate 10 and has a grooved pulley 21 fixed to its shaft. An electric generator 22 is mounted on a pedestal 23 secured to the bed plate 10. It has a grooved pulley 24 fixed to its shaft. A third grooved pulley 25 is fixed to shaft 15. Pulleys 21, 24 and 25 are in the same plane and provide a triangular arrangement simulating the arrangement of generator, fan, and cam shaft pulleys of an automobile fan-belt drive. A belt 26 to be tested is mounted about these three pulleys and with the clutch member 18 disengaged the belt 26 may be driven by motor 20 at a uniform velocity equal to that of an automobile engine running at high speed. The generator 22 may be used to load the drive or current therefrom may be utilized to measure the work performed by the belt. The portion of the apparatus heretofore described may be used for testing the belt at constant speed or for limbering the belt prior to testing it at slower fluctuating speed.

For driving the belt 26 at a lower fluctuating speed for observing squeal of the belt, an electric motor 30 is adjustably mounted on the bed plate 10. Its shaft has a grooved pulley 31 fixed thereto. A countershaft 32 is rotatably mounted on a tension lever 33 pivotally mounted on the bed plate 10. The lever may be adjusted by a screw 32a to tension the belts. A grooved pulley 34 is fixed to shaft 32 and is driven from pulley 31 by a belt 35. A second countershaft 37 is rotatably mounted in bearings 38, 39 on bed plate 10. Shaft 37 is parallel to shafts 16 and 32 and is driven from shaft 32 through a grooved pulley 40 fixed to shaft 32, a belt 41, and a pulley 42 fixed to shaft 37.

Shafts 37 and 16 are geared together by a pair of elliptical gears 43, 44 fixed respectively thereto and meshing with each other. The arrangement is such that motor 30 running at uniform speed drives shaft 16 at a regularly fluctuating speed, which, when clutch member 18 is engaged with clutch member 17, drives shaft 15, pulley 25 and the belt 26 at fluctuating speed. During such operation, motor 20 is deenergized and merely acts as an idler.

In operation, a belt 26 to be tested is placed on pulleys 21, 24 and 25. Clutch members 17, 18 are disengaged, and motor 20 is energized to drive the belt at a constant high speed comparable with its speed when mounted on an automobile or other drive. After the belt has been tested at uniform speed or is limbered properly, motor 20 is deenergized and clutch members 17, 18 are engaged. Motor 30 is then energized and drives belt 26 at a slower and fluctuating speed. The inertia of the drive is such as to cause some slippage of the belt as the speed fluctuates permitting the operator to observe any tendency of the belt to squeal during use.

I claim:

1. Apparatus for testing belts, said apparatus comprising a set of pulleys in triangular arrangement for engaging a belt to be tested, drive means for driving one of said pulleys, and gearing between said drive means and said pulley for cyclically fluctuating the speed of said pulley, said gearing comprising a pair of elliptical gears meshing with each other.

2. Apparatus for testing belts under a variety of speed conditions, said apparatus comprising a set of pulleys for supporting the belt in a running disposition thereon, means for driving one of said pulleys at a uniform speed while the belt is thus supported on said pulleys, means for driving another of said pulleys at fluctuating speed while the belt is thus supported on said pulleys, said apparatus including means for selectively operating each driving means to test said belt successively at the uniform speed and the fluctuating speed while it remains in the same running disposition on said pulleys.

3. Apparatus for testing belts under a variety of speed conditions, said apparatus comprising a set of pulleys for supporting the belt in a running disposition thereon, means for driving one of the said pulleys at a uniform speed while the belt is thus supported on said pulleys, and means for driving another of said pulleys at fluctuating speed while the belt is thus supported on said pulleys, said apparatus including a rotatable shaft secured to the second of said pulleys, and a clutch controlling operation of said shaft by the last said driving means.

JOSEPH L. WADDELL.

REFERENCES CITED

The following references are of record in the file of this patent:

UNITED STATES PATENTS

| Number | Name | Date |
|---|---|---|
| 1,749,297 | Norman | Mar. 4, 1930 |
| 1,954,483 | Krall | Apr. 10, 1934 |

FOREIGN PATENTS

| Number | Country | Date |
|---|---|---|
| 691,545 | Germany | May 30, 1940 |